United States Patent
Nunan et al.

(10) Patent No.: US 11,123,720 B2
(45) Date of Patent: *Sep. 21, 2021

(54) HYDROCARBON TRAP CATALYST

(71) Applicant: UMICORE AG & CO. KG, Hanau-Wolfgang (DE)

(72) Inventors: John Nunan, Tulsa, OK (US); David Moser, Ortonville, MI (US); Chad Alltizer, Broken Arrow, OK (US)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/983,240

(22) Filed: May 18, 2018

(65) Prior Publication Data

US 2019/0351398 A1    Nov. 21, 2019

(51) Int. Cl.
*B01J 23/44* (2006.01)
*B01J 35/00* (2006.01)
(Continued)

(52) U.S. Cl.
CPC ........ *B01J 29/7615* (2013.01); *B01D 53/945* (2013.01); *B01J 23/44* (2013.01); *B01J 35/0006* (2013.01); *B01J 35/04* (2013.01); *F01N 3/0814* (2013.01); *F01N 3/0835* (2013.01); *F01N 3/101* (2013.01); *B01D 2255/1023* (2013.01); *B01D 2255/502* (2013.01); *B01D 2255/504* (2013.01); *B01D 2255/9022* (2013.01); *B01D 2255/9032* (2013.01); *B01D 2255/912* (2013.01); *F01N 2570/12* (2013.01)

(58) Field of Classification Search
None
See application file for complete search history.

(56) References Cited

U.S. PATENT DOCUMENTS 8,753,596 B2    6/2014  Spurk et al.
8,926,925 B2    1/2015  Soeger et al.
(Continued)

FOREIGN PATENT DOCUMENTS

KR    20020061324    *    7/2002

OTHER PUBLICATIONS

Ch. Baerlocher, et al., "Atlas of Zeolite Framework Types", 5th revised edition, 2001, ISBN: 0-444-50701-9, pp. 1-303.

(Continued)

*Primary Examiner* — Sheng H Davis
(74) *Attorney, Agent, or Firm* — Smith, Gambrell & Russell, LLP

(57) ABSTRACT

The present invention relates to a catalyst comprising a carrier substrate of the length L extending between substrate ends a and b and two washcoat zones A and B, wherein washcoat zone A comprises a zeolite having a smallest lower channel width of at least 0.4 nm and extends starting from substrate end a over a part of the length L, and washcoat zone B comprises the same components as washcoat A and palladium and extends from substrate end b over a part of the length L, wherein $L=L_A+L_B$, wherein $L_A$ is the length of washcoat zone A and $L_B$ is the length of substrate length B.

22 Claims, 1 Drawing Sheet

(51) Int. Cl.
  *B01D 53/94* (2006.01)
  *B01J 29/76* (2006.01)
  *B01J 35/04* (2006.01)
  *F01N 3/08* (2006.01)
  *F01N 3/10* (2006.01)

(56) References Cited

U.S. PATENT DOCUMENTS

| | | | |
|---|---|---|---|
| 10,213,767 B2 | 2/2019 | Reith et al. | |
| 10,443,463 B2 | 10/2019 | Hoyer et al. | |
| 2012/0328499 A1* | 12/2012 | Ando | B01D 53/9431 |
| | | | 423/213.5 |
| 2013/0084222 A1* | 4/2013 | Grubert | B01J 29/04 |
| | | | 422/170 |
| 2015/0037221 A1* | 2/2015 | Shibata | F01N 3/0222 |
| | | | 422/177 |
| 2016/0136626 A1 | 5/2016 | Phillips et al. | |
| 2016/0367941 A1* | 12/2016 | Gilbert | B01D 53/9436 |
| 2017/0067387 A1 | 3/2017 | Khaled | |
| 2017/0128922 A1 | 5/2017 | Chen et al. | |
| 2017/0218823 A1* | 8/2017 | Crawford | F01N 3/2026 |
| 2017/0284253 A1* | 10/2017 | Liu | F01N 3/101 |
| 2018/0111089 A1* | 4/2018 | Li | B01D 53/9472 |
| 2019/0226372 A1 | 7/2019 | Price et al. | |

OTHER PUBLICATIONS

DIN 66132:Bestimmung der spezifischen Oberfläche von Feststoffen durch Stickstoffadsorption; Einpunkt-Differenzverfahren nach Haul and Dümbgen, [Determination of specific surface area of solids by adsorption of nitrogen; single-point differential method according to Haul and Dümbgen.] Standard by Deutsches Institut Fur Normung E.V. [German National Standard], 1975. 5 pages in German (with English machine translation).
International Search Report dated Aug. 29, 2019 for International Patent Application No. PCT/EP2019/062634 (4 pages).
Written Opinion of the International Searching Authority dated Aug. 29, 2019 for International Patent Application No. PCT/EP2019/062624 (5 pages).

* cited by examiner

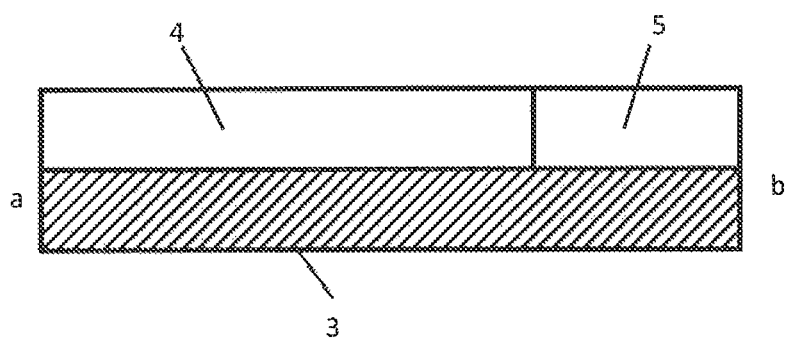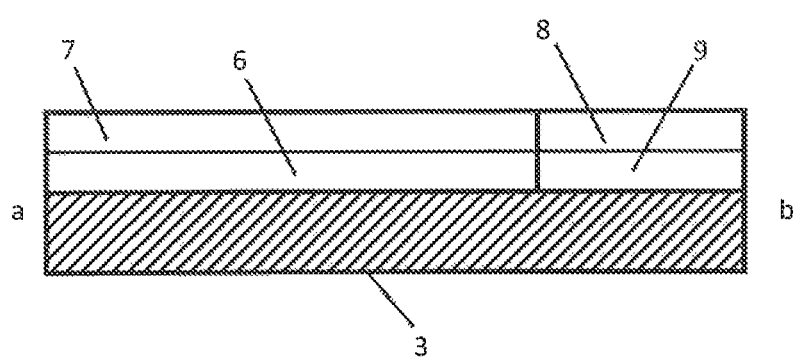

HYDROCARBON TRAP CATALYST

The present invention relates to a hydrocarbon trap catalyst for trapping hydrocarbons during cold start of combustion engines operated with a predominantly stoichiometric air/fuel ratio.

It is well known in the field of combustion engines that fuel combustion is not complete and yield emissions of pollutants like unburned hydrocarbons (HC), carbon monoxide (CO), nitrogen oxides ($NO_x$) and particulate matter (PM). In order to improve air quality, emission limits legislations are in place to achieve lower emissions of pollutants from stationary applications and from mobile sources. For mobile sources like passenger cars, primary measures enabled achieving decrease in the emission of pollutants. Improvement of fuel-air mixing as primary measure yielded considerable diminution of pollutants. However, due to more stringent legislations over the years, the use of heterogeneous catalysts has been made inevitable.

For gasoline engines, so-called three-way catalysts (TWC) enable the elimination of HC, CO and $NO_x$. Optimal use of the TWC is around Lambda=1+/−0.005 where the air/fuel ratio is equal to 14.56. Above these values, the exhaust gas is said lean, and CO and HC are catalytically oxidized to carbon dioxide and water. Below this value, the exhaust gas is said rich and mainly $NO_x$ is reduced to nitrogen using e.g. CO as reducing agent.

Optimal conversion of HC, CO and $NO_x$ is achieved at Lambda=1. However, gasoline engines operate under oscillating conditions between slightly lean and slightly rich conditions. Under purely rich conditions, the conversion of hydrocarbon drops rapidly. In order to broaden the optimal operation of a TWC, oxygen storage material (OSM) in the form of Ce-mixed oxides were included in the formulation of the TWC.

Like other catalysts, three-way-catalysts are not active until they reach a certain temperature, the so-called light-off temperature, which is usually around 200° C. Below this temperature, for example during cold start, other measures need to be taken in order to avoid leakage of pollutants via the tailpipe. This is of particular importance in case of hydrocarbons because they are mainly produced during cold start.

This situation resulted in the development of so-called hydrocarbon traps. HC traps are basically storage materials which adsorb hydrocarbons while the exhaust gas is cold and the three-way-catalyst is not yet active (for example during a cold start) and desorb and release them when the exhaust-gas temperature is higher and the three-way-catalyst has reached its light-off temperature.

Materials for storing hydrocarbons are usually zeolitic materials or so-called molecular sieves. Examples are mordenite (MOR), Y-zeolites (FAU), ZSM-5 (MFI), β-zeolites (BEA) and mixtures thereof. These are preferably used in H-form or $NH_4$-form or are exchanged with transition metals.

Catalyzed HC-traps integrate an oxidizing function into the storing function and preferably consist of an adsorber material containing zeolitic material and a three-way catalyst, for example in form of a separate layer, containing oxygen storage components and platinum group metals like platinum, palladium and rhodium. This allows to directly oxidize the hydrocarbons desorbed and released by the adsorbing material.

The oxidation can be achieved by oxygen present in the gas phase or oxygen from an "oxygen carrier" in the trap washcoat. The latter component can include redox active base metals such as those derived from the oxides of transitions metals such as Fe, Mn, Co and Cu, rare earth elements such as Ce, Pr, Sm, Tb or P block elements such as Sn and In.

It is conventional to distribute the platinum group metals uniformly through the full length of the HC trap substrate or to locate a highly concentrated platinum group metal zone at the catalyst inlet with respect to the direction of exhaust flow.

In a typical HC trap application the emission system consists of a close coupled TWC catalyst with the HC trap located as a separate converter in a cool under-body location. In this type application the HC trap heats up slowly with a large temperature gradient of up to 100° C. between the front inlet end of the trap as compared to the rear outlet. Hydrocarbons are initially adsorbed by the inlet end of the trap with respect to exhaust flow as they contact this location of the trap initially. As the trap heats up a desorption/adsorption process occurs such that the adsorbed hydrocarbons move from the front of the trap to the rear in a similar way to the movement of a solvent with optionally other dissolved components in a chromatographic column whereby the solvent and soluble components gradually move from the bottom of the column to higher levels. Desorption of the trapped molecules in the front hotter region of the trap is followed by rapid re-adsorption by the rear cooler regions of the trap until the adsorbed molecules gradually reach the rear section of the trap where they are finally desorbed into the gas phase and escape the trap.

It has now been found that in this design with a high concentration of platinum group metals being placed at the front inlet side of the trap any possibility of hydrocarbon conversion is lost once the adsorbed hydrocarbons move past this zone on their way to the rear of the trap. On the other hand, with the zone of high platinum group metal content at the rear of the trap, all of the adsorbed hydrocarbons must move past this zone and if the platinum group metal concentration is sufficiently high conversion can occur.

Accordingly, the present invention pertains to a catalyst comprising a carrier substrate of the length L extending between substrate ends a and b and two washcoat zones A and B, wherein washcoat zone A comprises a zeolite having a smallest lower channel width of at least 0.4 nm and extends starting from substrate end a over a part of the length L, and washcoat zone B comprises the same components as washcoat zone A and an amount of palladium and extends from substrate end b over a part of the length L, wherein $L=L_A+L_B$, wherein $L_A$ is the length of washcoat zone A and $L_B$ is the length of washcoat zone B.

Accordingly, according to the present invention the zeolite having a smallest lower channel width of at least 0.4 nm is distributed uniformly through the full length L of the carrier substrate, whereas palladium is present in washcoat zone B.

Zeolites are two- or three-dimensional structures, which comprise as smallest units $SiO_4$— and $AlO_4$-tetrahedra. These tetrahedra combine to form larger structures, wherein each two of them are connected by a common oxygen atom. This results in the formation of rings of different sizes, for example rings of four, six or even ten and more tetrahedrally coordinated silicon or aluminum atoms.

The different zeolite types are roughly defined by their largest ring size, because this size determines which guest molecules can and which cannot penetrate into the zeolite structure. It is common to distinguish large pore zeolites with a maximum ring size of 12, medium pore zeolites with a maximum ring size of 10, and small pore zeolites with a maximum ring size of 8.

Zeolites may have differently structured channels in one and the same material. The orifices of these channels can be described via their crystallographic free diameters, in particular via a lower and an upper channel width. For example, the zeolite known as ZSM-5 possesses 10-ring channels with an upper channel width of 0.55 nm and a lower channel width of 0.51 nm (see Atlas of Zeolite Framework Types, Elsevier, 6th Edition, 2007).

In addition, zeolites are subdivided into structural types by the Structure Commission of the International Zeolite Association, each of which has a three-letter code (see, for example, Atlas of Zeolite Framework Types, Elsevier, 6th Edition, 2007).

The zeolite of washcoat zone A preferably has a smallest lower channel width of 0.4 nm to 0.8 nm.

In embodiments of the present invention the zeolite of washcoat zone A belongs to the structure type codes (as defined in the Atlas of Zeolite Framework Types, Elsevier, sixth revised edition, 2007) BEA, FAU, FER, MFI or MOR. A preferred zeolite belongs to the structure type code BEA or MFI. A preferred zeolite of the structure type code MFI is for example ZSM-5 whereas a preferred zeolite of the structure type code BEA is Beta.

Preferred zeolites have a SAR (silica-to-alumina ratio) value of 2 to 100, in particular 5 to 50.

The zeolite is usually present in washcoat zones A and B in an amount of 120 to 340 g/l based on the volume of the carrier substrate.

In embodiments of the present invention the zeolite having a smallest lower channel width of at least 0.4 nm is present in its H-form or in its $NH_4$-form. In other embodiments the zeolite having a smallest lower channel width of at least 0.4 nm comprises a metal. Suitable metals are for example iron, copper, manganese, nickel, cobalt, tin, palladium, platinum, rhodium, silver or mixtures of two or more thereof.

In embodiments of the present invention the metal is present in cationic form. In that case a counterion must be present which can be the zeolite. With other words the metal cation is located within the three-dimensional zeolite structure and neutralizes its negative charge.

Alternatively or in addition the metal can be present in oxidic form.

In any case, the metal can be present in cationic form within the zeolite structure or in oxidic form within and/or on the surface of the zeolite. Noble metals, like platinum and palladium, can in addition be present in metallic form. The metallic form as well can be within and/or on the surface of the zeolite The metal is usually present in washcoat zones A and B in an amount of 0.1 to 10% by weight based on the weight of the zeolite and calculated as oxide.

Preferred metals are iron, which can be present in cationic form or in oxidic form, for example in form of $Fe_2O_3$, and palladium, which can be present in cationic, oxidic or metallic form.

In case washcoat zone A comprises palladium, it is present in washcoat zone B at a higher concentration compared to washcoat zone A.

In an embodiment of the present invention washcoat zone A comprises two layers A1 and A2, which both extend over the length $L_A$ and wherein layer A1 comprises a zeolite having a smallest lower channel width of at least 0.4 nm and layer A2 comprises rhodium, and washcoat zone B comprises two layers B1 and B2, which both extend over the length $L_B$ and wherein layer B1 comprises the same components as layer A1 and layer B2 comprises the same components as layer A2 and wherein layers B1 and B2 in addition comprise palladium and—in case washcoat zone A comprises palladium—a higher amount of palladium compared to layers A1 and A2, respectively.

In preferred embodiments of the present invention washcoat zones A and B are, apart from the presence of palladium and the higher amount of palladium, respectively, in washcoat zone B, identical. Likewise, layers A1 and B1 are, apart from the presence of palladium and the higher amount of palladium, respectively, in layer B1, identical and layers A2 and B2 are, apart from the presence of palladium and the higher amount of palladium, respectively, in layer B2, identical.

The palladium content in washcoat zone B is usually 2 to 20 g/l, based on the volume of the carrier substrate and calculated as palladium metal. In case washcoat zone A comprises palladium as well, its content in washcoat zone B is higher than in washcoat zone A.

The advantages of using palladium in washcoat zone B compared to other platinum group metals like platinum and rhodium are the lower cost and in particular its high effectiveness for burning hydrocarbons, especially large hydrocarbons such as branched alkenes/alkanes and aromatics that will be retained within the trap to higher temperatures. Further, in the case of palladium there is a high performance gradient with respect to palladium loading and HC light-off. The light-off temperatures can decrease by over 100° C. as we move from low Pd loadings of 10 g/ft$^3$ (0.35 g/l) to loadings of just over 100 g/ft$^3$ (3.5 g/l) after moderate to severe aging.

In case the catalyst of the present invention comprises washcoat layers A1 and A2 and layers B1 and B2, respectively, rhodium contained in layers A2 and B2 is usually supported on a carrier material.

As carrier material all materials can be used which are known to the skilled person for that purpose. Usually, they have a BET surface of 30 to 250 m$^2$/g, preferably of 100 to 200 m$^2$/g (determined according to German standard DIN 66132) and are in particular alumina, silica, magnesia, titania, as well as mixtures or mixed oxides comprising at least two of these materials.

Preferred are alumina, alumina/silica mixed oxides and magnesia/alumina mixed oxides. In case alumina is used, it is preferably stabilized, for example with 1 to 6 weight percent, in particular 4 weight percent, of lanthana.

The rhodium is usually present in layers A2 and B2 in an amount of 0.04 to 4.0 g/l, based on the volume of the carrier substrate and calculated as rhodium metal.

In embodiments of the present invention washcoat zone A extends over 70 to 90% of the length L of the carrier substrate, preferably 73 to 85% and washcoat zone B extends over 10 to 30% of the length L of the carrier substrate, preferably 15 to 27%.

In embodiments of the present invention the carrier substrate of the length L can be a flow through or a filter substrate. Such carrier substrates are usually made of cordierite or metal and are described in literature and available on the market.

The catalyst of the present invention can be manufactured by known methods, in particular by a two-step process which comprises coating of the carrier substrate with a coating suspension (washcoat) which contains the components of washcoat zone A over its entire length L and dipping the coated carrier substrate in a aqueous solution containing a water soluble palladium compound until a length which corresponds with the length of washcoat zone B, so as to form washcoat zone B.

The coating in the first step is usually performed via conventional immersion, suction and pumping methods which are extensively described in literature and known to the person of skill in the art.

The first and second step are usually followed by calcination and optionally thermal reduction in an atmosphere which contains forming gas.

The catalyst of the present invention is suitable for the treatment of exhaust gases of engines operated with a predominantly stoichiometric air/fuel ratio, the treatment of the exhaust gas being carried out by passing the exhaust gas over the inventive catalyst.

Accordingly, the present invention further relates to a method for treating the exhaust gas of an engine operated with a predominantly stoichiometric air/fuel ratio, characterized in that the exhaust gas is passed over an inventive catalyst wherein it enters the catalyst at substrate end a and exits it at substrate end b.

FIG. 1 illustrates catalysts according to the present invention. The upper part shows a detail of an inventive catalyst (1) which comprises a carrier substrate (3) which extends between substrate ends a and b and which carries washcoat zone A (4) and washcoat zone B (5). The lower part shows a detail of another embodiment of the invention. Catalyst (2) comprises a carrier substrate (3) which extends between substrate ends a and b. Washcoat zone A comprises layer A1 (6) and A2 (7) whereas washcoat zone B comprises layer B1 (9) and layer B2 (8). Layers A1 (6) and B1 (9) differ only in that B1 (9) comprises palladium or a higher amount of palladium compared to A1 (6). Likewise, layers A2 (7) and B2 (8) differ only in that B2 (8) comprises palladium or a higher amount of palladium compared to A2 (7).

COMPARISON EXAMPLE 1 a) Slurry preparation begins with addition of an alumina stabilized silica sol (Aeroperl 3375/20 purchased from Evonik) to water and mixing. This material represents 4.5 wt % of the final calcined washcoat loading. This step is followed by the addition of a boehmite (SASOL SCF-55 purchased from Sasol) and iron nitrate at contents of 1.0 and 4.5 wt % respectively of the final calcined washcoat. Finally beta zeolite in the ammonium form and having a SAR value of 25 was added and the slurry was then aged for two days.

b) This slurry was then coated onto a ceramic substrate having 400 cpsi/4.3 mill cell structure and 4.66" round by 4.5" long giving a total volume of 1.26 Liters and a WC load of 4.0 g/in$^3$ or 258 g/l. Calcination of the coated trap was done at 540° C. in air.

EXAMPLE 1

An inventive catalyst was prepared as described in Example 1 but in this case a Pd solution band was applied by dipping one end of the catalyst in a Pd nitrate solution containing citric acid and 2 wt % ethanol. The substrate used was a 400 cpsi/4.3 mill cell structure, 4.66" round by 4.5" long giving a total volume of 1.26 Liters. The concentration of the dipped solution was adjusted such that with a solution band length of 3 cm (1.2") long the Pd concentration was 250 g/ft$^3$ in the dipped zone. The PGM loading averaged over the full part was 60 g/ft$^3$ © 0:11:1 (includes the Pd in the band and in the TWC layer).

The invention claimed is:

1. A hydrocarbon trap catalyst for treating exhaust gas generated by a predominately stoichiometric running engine, comprising a carrier substrate of the length L extending between substrate ends a and b and two washcoat zones A and B, wherein washcoat zone A is arranged as an upstream positioned zone on the carrier substrate that comes in contact with the exhaust gas generated by the predominately stoichiometric running engine, the washcoat zone A comprises a zeolite having a smallest lower channel width of at least 0.4 nm and extends starting from substrate end a over a part of the length L, and washcoat zone B is arranged as a downstream positioned zone on the carrier substrate that comes in contact with the exhaust gas generated by the predominately stoichiometric running engine after the first washcoat zone A, the washcoat zone B comprises the same components as washcoat zone A, but for washcoat zone B having a higher palladium amount than washcoat zone A, and washcoat zone B extends from substrate end b over a part of the length L, wherein the palladium loading in washcoat zone B is 3.5 to 20 g/l based on the volume of the carrier and calculated as palladium metal, and wherein $L=L_A+L_B$, wherein $L_A$ is the length of washcoat zone A and $L_B$ is the length of washcoat zone B.

2. Catalyst according to claim 1, wherein the zeolite has a smallest lower channel width of 0.4 nm to 0.8 nm.

3. Catalyst according to claim 1, wherein the zeolite belongs to the structure type code BEA, FAU, FER, MFI or MOR.

4. Catalyst according to claim 1, wherein the zeolite is ZSM-5 or beta zeolite.

5. Catalyst according to claim 1, wherein washcoat zone A comprises two layers A1 and A2, which both extend over the length $L_A$, wherein layer A1 comprises the zeolite having a smallest lower channel width of at least 0.4 nm and layer A2 comprises rhodium, and washcoat zone B comprises two layers B1 and B2, which both extend over the length $L_B$, wherein layer B1 comprises the same components as layer A1 and layer B2 comprises the same components as layer A2, but for layers B1 and B2 comprising a higher palladium amount as compared to layers A1 and A2, respectively.

6. Catalyst according to claim 1, wherein washcoat zones A and B are, apart from the amount of palladium in washcoat zone B, identical in composition.

7. Catalyst according to claim 1, wherein zeolite is present in washcoat zones A and B in an amount of 120 to 340 g/l based on the volume of the carrier substrate.

8. Catalyst according to claim 1, wherein washcoat zone A extends over 70 to 90% of the length L of the carrier substrate and washcoat zone B extends over 10 to 30% of the length L of the carrier substrate.

9. Catalyst according to claim 1, wherein the carrier substrate of the length L is a flow through substrate.

10. Catalyst according to claim 1 wherein the zeolite in washcoat zone A comprises iron, and the zeolite in washcoat zone B comprises palladium and iron, and the metal content in each of washcoat zones A and B is in an amount of 0.1 to 10% by weight based on the weight of the zeolite and calculated as oxide.

11. Catalyst according to claim 1, wherein the zeolite in each of washcoat zones A and B comprises iron.

12. Catalyst according to claim 1, wherein the same components present in each of washcoat zones A and B are received in a common washcoat layer that extends for length L.

13. Catalyst according to claim 1, wherein washcoat zone A is free of palladium.

14. A hydrocarbon trap catalyst for treating exhaust gas generated by a predominately stoichiometric running engine, comprising a carrier substrate of the length L extending between substrate ends a and b and two washcoat zones A and B, wherein
- washcoat zone A is arranged as an upstream positioned zone on the carrier substrate that comes in contact with the exhaust gas generated by the predominately stoichiometric running engine, the washcoat zone A comprises a zeolite having a smallest lower channel width of at least 0.4 nm and extends starting from substrate end a over a part of the length L, and
- washcoat zone B is arranged as a downstream positioned zone on the carrier substrate that comes in contact with the exhaust gas generated by the predominately stoichiometric running engine after the first washcoat zone A, the washcoat zone B comprises the same components as washcoat zone A, but for washcoat zone B having a higher palladium amount than washcoat zone A, and washcoat zone B extends from substrate end b over a part of the length L, wherein the palladium loading in washcoat zone B is 3.5 to 20 g/l based on the volume of the carrier and calculated as palladium metal, and
- wherein $L=L_A+L_B$, wherein $L_A$ is the length of washcoat zone A and $L_B$ is the length of washcoat zone B, wherein the zeolite comprises at least one metal, wherein the at least one metal includes palladium that is present in each of washcoat zones A and B.

15. Catalyst according to claim 14, wherein the metal further includes iron, copper, manganese, nickel, cobalt, tin, platinum, rhodium, silver or a mixture of two or more thereof.

16. Method of treating exhaust gases of a predominately stoichiometric running combustion engine, comprising; passing the exhaust gas produced by the predominately stoichiometric running combustion engine over the catalyst of claim 1, wherein the exhaust gas enters the catalyst at substrate end a and exits at substrate end b.

17. Catalyst according to claim 1, wherein the zeolite in each of washcoat zones A and B includes iron, and the washcoat zone A is free of palladium.

18. The method of claim 16 wherein the catalyzed carrier substrate is an under-body located hydrocarbon trap catalyzed carrier substrate that is positioned downstream from a close coupled three way catalyst also receiving exhaust gas from the predominately stoichiometric running engine.

19. A hydrocarbon trap catalyst for treating exhaust gas generated by a predominately stoichiometric running engine, comprising a flow through carrier substrate of the length L extending between substrate ends a and b and two washcoat zones A and B, wherein
- washcoat zone A represents an upstream positioned zone on the carrier substrate that is arranged to come in contact with the exhaust gas generated by the predominately stoichiometric running engine, the washcoat zone A comprises a zeolite having a smallest lower channel width of at least 0.4 nm and extends starting from the flow through carrier substrate end a over a part of the length L, and
- washcoat zone B represents a downstream positioned zone on the carrier substrate that is arranged to come in contact with the exhaust gas generated by the predominately stoichiometric running engine after the first washcoat zone A, the washcoat zone B comprises the same components as washcoat zone A, but for washcoat zone B having a higher palladium loading than washcoat zone A, and washcoat zone B extends from substrate end b over a part of the length L,
- wherein $L=L_A+L_B$, wherein $L_A$ is the length of washcoat zone A and $L_B$ is the length of washcoat zone B, and wherein washcoat zone A includes Pd, Rh, or Pd and Rh, and washcoat zone B includes Pd at a washcoat loading of 3.5 g/l to 20 g/l.

20. Catalyst according to claim 19 wherein the zeolite in washcoat zone A comprises iron, and the zeolite in washcoat zone B comprises palladium and iron, and the metal content in each of washcoat zones A and B is in an amount of 0.1 to 10% by weight based on the weight of the zeolite and calculated as oxide.

21. Catalyst according to claim 19, wherein the zeolite in each of washcoat zones A and B comprises iron.

22. Catalyst according to claim 19, wherein washcoat zone A is free of palladium.

* * * * *